(12) United States Patent
Mazzone et al.

(10) Patent No.: US 11,334,735 B2
(45) Date of Patent: May 17, 2022

(54) DETACHABLE ADAPTER DEVICE FOR SIMPLIFIED REPLACEMENT OF A BASE STATION FOR A WIRELESS BARCODE SCANNER

(71) Applicant: Datalogic IP Tech S.r.l., Lippo di Calderara di Reno (IT)

(72) Inventors: Claudio Mazzone, Lippo di Calderara di Reno (IT); Fabio Albanese, Lippo di Calderara di Reno (IT); Stefano Ciabattoni, Lippo di Calderara di Reno (IT); Loretta Chinaglia, Lippo di Calderara di Reno (IT)

(73) Assignee: Datalogic IP Tech S.r.l, Lippo di Calderara di (IT)

( * ) Notice: Subject to any disclaimer, the term of this patent is extended or adjusted under 35 U.S.C. 154(b) by 0 days.

(21) Appl. No.: 16/705,924

(22) Filed: Dec. 6, 2019

(65) Prior Publication Data

US 2021/0174040 A1    Jun. 10, 2021

(51) Int. Cl.
G06K 9/22      (2006.01)
G06K 7/10      (2006.01)
G06K 7/14      (2006.01)

(52) U.S. Cl.
CPC ....... *G06K 7/10881* (2013.01); *G06K 7/1413* (2013.01); *G06K 2007/10524* (2013.01)

(58) Field of Classification Search
CPC ........ G06F 1/1632; G06F 1/1626; G06F 1/26; H04M 1/04; H04M 1/72527
USPC ...................................... 235/462.45, 472.01
See application file for complete search history.

(56) References Cited

U.S. PATENT DOCUMENTS

| | | | | |
|---|---|---|---|---|
| 5,052,943 A | * | 10/1991 | Davis | H02J 7/0042 439/357 |
| 5,708,707 A | * | 1/1998 | Halttunen | B60R 11/0241 379/446 |
| 6,341,218 B1 | * | 1/2002 | Poplawsky | B60R 11/0241 379/420.01 |
| 6,705,527 B1 | | 3/2004 | Kelly et al. | |
| 6,942,153 B1 | * | 9/2005 | Yuan | G06F 1/1626 235/380 |

(Continued)

FOREIGN PATENT DOCUMENTS

WO    2010/018982 A2    2/2010

OTHER PUBLICATIONS

Extended European Search Report and Opinion received for European Patent Application No. 20210882.5, dated Feb. 4, 2021, 7 pages.

*Primary Examiner* — Daniel St Cyr
(74) *Attorney, Agent, or Firm* — Shook, Hardy & Bacon, L.L.P.

(57) ABSTRACT

A removable adapter device is integrated into a cradle for holding a handheld scanner. The adapter device enables the cradle to be removed and reattached or removed and replaced with another cradle without needing access to or changing cables that connect the cradle to a host system. The adapter device provides a standardize configuration, connection, or both to allow simplified replacement of different manufacturer cradles and scanners without concern about the cable connection to the host system. The adapter device acts as an interface for data and power transmission between the cradle and the host system.

20 Claims, 7 Drawing Sheets

(56) References Cited

U.S. PATENT DOCUMENTS

| | | | |
|---|---|---|---|
| 7,116,554 B2* | 10/2006 | Lee | G06F 1/1632 |
| | | | 361/695 |
| 7,380,705 B2 | 6/2008 | Terlizzi et al. | |
| 7,480,138 B2 | 1/2009 | Kogan et al. | |
| 8,183,825 B2* | 5/2012 | Sa | G06F 1/1626 |
| | | | 320/107 |
| 8,474,724 B2 | 7/2013 | Theile et al. | |
| 9,922,722 B2 | 3/2018 | Deal et al. | |
| 2002/0099895 A1* | 7/2002 | Landron | G06F 1/1632 |
| | | | 710/303 |
| 2004/0129522 A1* | 7/2004 | Skowronski | H02G 11/02 |
| | | | 191/12.2 R |
| 2005/0083975 A1* | 4/2005 | Macri | H04N 21/43637 |
| | | | 370/486 |
| 2005/0086389 A1* | 4/2005 | Chang | H04W 88/02 |
| | | | 709/250 |
| 2005/0250555 A1* | 11/2005 | Richardson | H04B 1/38 |
| | | | 455/572 |
| 2006/0270345 A1 | 11/2006 | DiGiovanna et al. | |
| 2007/0057063 A1 | 3/2007 | Zhu et al. | |
| 2009/0323133 A1 | 12/2009 | Koch et al. | |
| 2012/0131232 A1 | 5/2012 | Brownlow et al. | |
| 2016/0179705 A1 | 6/2016 | Barten | |
| 2016/0274921 A1 | 9/2016 | Walker | |
| 2017/0017595 A1 | 1/2017 | Schnell | |

* cited by examiner

DETACHABLE ADAPTER DEVICE FOR SIMPLIFIED REPLACEMENT OF A BASE STATION FOR A WIRELESS BARCODE SCANNER

CROSS-REFERENCE TO RELATED APPLICATIONS

This application is related to the application titled "Data Transfer Device and Method of Interfacing and Using the Same," which is filed on the same date and is herein incorporated by reference.

BACKGROUND

A wireless bar code reader (scanner) 110 is used in most cases together with a base station (also called cradle) 120 to which the scanner 110 may be docked in a system 100. The cradle 120 has the following functions: It is a receiving unit, and works as a gateway between the scanner and a host system; it has different types of programmable interfaces (e.g. USB, Ethernet, RS232, etc.) by which the data transmitted (sometimes via radio at antenna 105) from the scanner 110 to the cradle 120 are then transferred to the host system in the desired format; it works as a charging system for the battery in the scanner 110 (by contacts or wireless charging solutions); it is used to keep the scanner 110 in its position; and it can allow the scanner 110 to work as a presentation scanner, where scanning can occur and the scanner window is visible even while the scanner 110 is in the cradle 120. Usually, the cradle 120 must be connected by cables to the host system and the power supply. An external power supply is typically needed when the power required to charge the battery and operate the scanner 110 docked in the cradle 120 is larger than the power that the host system can deliver.

For the scanner 110 docked in its cradle 120, the cables (not shown in FIG. 1) used for the cradle 120 connection to the host system are usually in the lower part of the cradle 120. When the cradle 120 is installed (by screws or other methods into customer structures, such as walls, tables, etc.), sometimes, the cables may be difficult to access or remove. When a cradle is broken or must be replaced for service, cable removal can be difficult and time consuming. Usually, the cable removal is performed by an expert technician.

The inventors have appreciated that a solution is needed that allows an operator (e.g., cashier) to replace a broken cradle while avoiding any interruption in performance service. Particularly, easy replacement of the cradle is important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosed system described herein utilizes an adapter device that is configured to connect to a cradle to form an integrated unit. The adapter device is removable from the cradle. The adapter device may be waterproof, and when the adapter device is connected to the cradle, the adapter device and the cradle can form a waterproof seal. The connection of the adapter device to the cradle is such that a shape of the adapter device is integrated into the shape of the cradle to form the integrated unit. Cables are connected to the adapter device such that the cradle is detachable and removed, and another cradle is connected to the adapter device.

Also, the disclosed system described herein may include the adapter device connected to a connector, which connects to the cradle. The connector allows the cradle to have data and power transmissions to a host system by providing the flexibility of the connector to connect directly to a cable that links to the host system or to connect to the adapter device, which in turn, connects to one or several cables that link to the host system.

In a first aspect, an adapter device is provided that connects to a cradle to form an integrated unit for holding a scanner. The adapter device is attachable to and removable from the cradle. The connection of the adapter device to the cradle is such that a shape of the adapter device is integrated into the shape of the cradle to form the integrated unit. Cables are connected to the adapter device to provide power and data through the adapter device to the cradle. When the adapter device is detached and removed from the cradle, the cables remain connected to the adapter device.

In another aspect, an adapter device is provided that connects to a cradle to form an integrated unit for holding a scanner. The cradle has a pivotal connector for power transmission and data transmission between the cradle and a host system. At a first interface, the adapter device is attachable to and detachable from the cradle at the pivotal connector. At a second interface, the adapter device connects to cables that connect to the host system. While the adapter device is connected to the cradle through the pivotal connector, the adapter device is positioned with the cradle in a configuration where a shape of the adapter device is integrated into the shape of the cradle to form the integrated unit. The cradle is detachable and removed from the adapter device at the first interface with the pivotal connector.

In yet another aspect, a cradle for holding a scanner has a cable connection to a host system. The cradle has a pivotal connector for power transmission and data transmission between the cradle and the host system. The pivotal connector is positioned so that at a first end the pivotal connector rotates at an entry point at the cradle and at a second end the pivotal connector extends outward from the cradle and moves radially when the pivotal connector rotates at the first end. At the second end, the pivotal connector connects to a cable that connects to the host system. The cable is detachable from the pivotal connector. The cradle is detached.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of aspects of the present invention is described with specificity herein to meet statutory requirements. However, the description itself is not intended to limit the scope of this patent. Additionally, the application titled "Data Transfer Device and Method of Interfacing and Using the Same," which is owned by Applicant and filed on the same date, is herein incorporated by reference.

Figure 1:
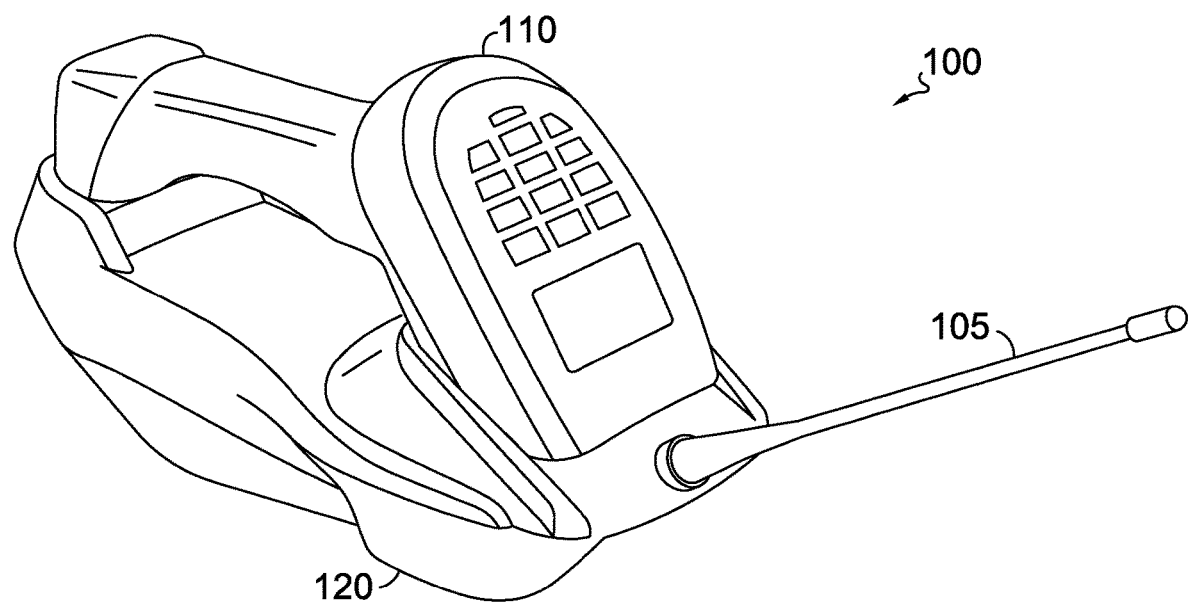
FIG. 1 is an illustration of a handheld scanner docked in a cradle.
Figure 2:
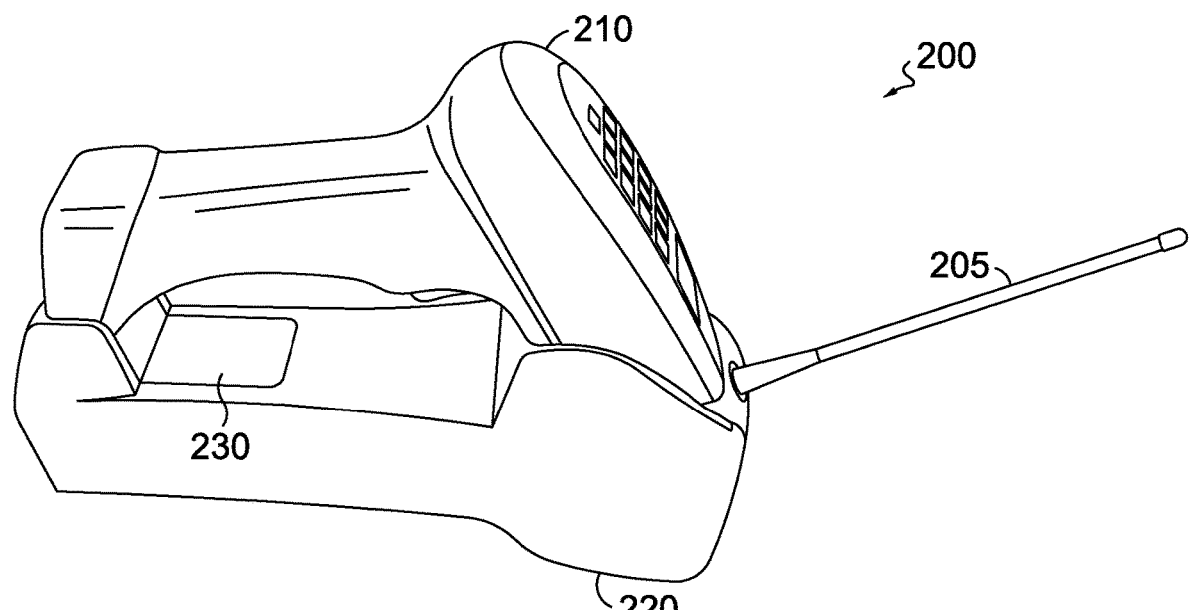
FIG. 2 is an illustration of a handheld scanner docked in the cradle with an adapter device, implemented in accordance with an embodiment of the present invention.

FIG. 2 is an illustration of a system 200 including a handheld scanner 210 docked in a cradle 220 with an adapter device 230, implemented in accordance with an embodiment of the present invention The adapter device 230 connects to the cradle 220 to form an integrated unit for holding the scanner 210. The adapter device 230 is interchangeably referred to as a connection box, adapter, adapter module, device, or a physical component that can be removed from the cradle 220 while staying connected to other devices and then reconnected to the cradle 220 or another cradle. The integrated unit (i.e., cradle 220 and adapter device 230) may be configured to hold the handheld scanner 210. However, in some embodiments, the cradle 220 can also hold the scanner 210 without the adapter device 230 (e.g. with the adapter device 230 removed from the cradle 220). The cradle 220 may also include an antenna 205 for radio transmission. The adapter device 230 is attachable to and removable from the cradle 220. The adapter device 230 may be waterproof, and when the adapter device 230 is connected to the cradle 220, the adapter device 230 and the cradle 220 can form a waterproof seal. Additional details of the adapter device 230 will be provided below with reference to the subsequent figures.

The adapter device can be manufactured in different models to work as an interface between existing cables and products. This ability to have different models of the adapter device allows easy substitution of existing cradles, even if the cradles are manufactured by different companies. Rather than have different types of connections, it is possible to have interface connections that are standardized, such as Universal Serial Bus (USB), Registered Jack 45 (RJ45), M5, M8, M12, M16, or M23 connectors, to name a few. On the other hand, the adapter device can be manufactured to fit a set of legacy cables that cannot be removed. In this way, the adapter device can connect to the legacy cables on one side and be configured internally to connect to the other side to perform signal conversion, as necessary, to interface with the cradle, and ultimately the scanner or scanning adapter device that is docked. In other words, the adapter device performs the functions of an adapter to provide the interface and transition connection between the existing cables and the cradle.

Further, regarding the conversion aspect of the adapter device, the adapter device can be used to convert signals between the cradle and the host system. Additionally, the adapter device may include a radio in order to provide Institute of Electrical and Electronics Engineers (IEEE) 802.11x (WIFI) capabilities to the cradle. As shown in FIG. 2, the cradle may have a first radio as shown by the antenna 205. By adding a second radio into the adapter device, the cradle can have WIFI capabilities to transmit and receive data. Please note that the adapter device does not necessarily have to include a physical external antenna in order to have WIFI. The adapter device may incorporate an integrated antenna in some embodiments.

Figure 3:
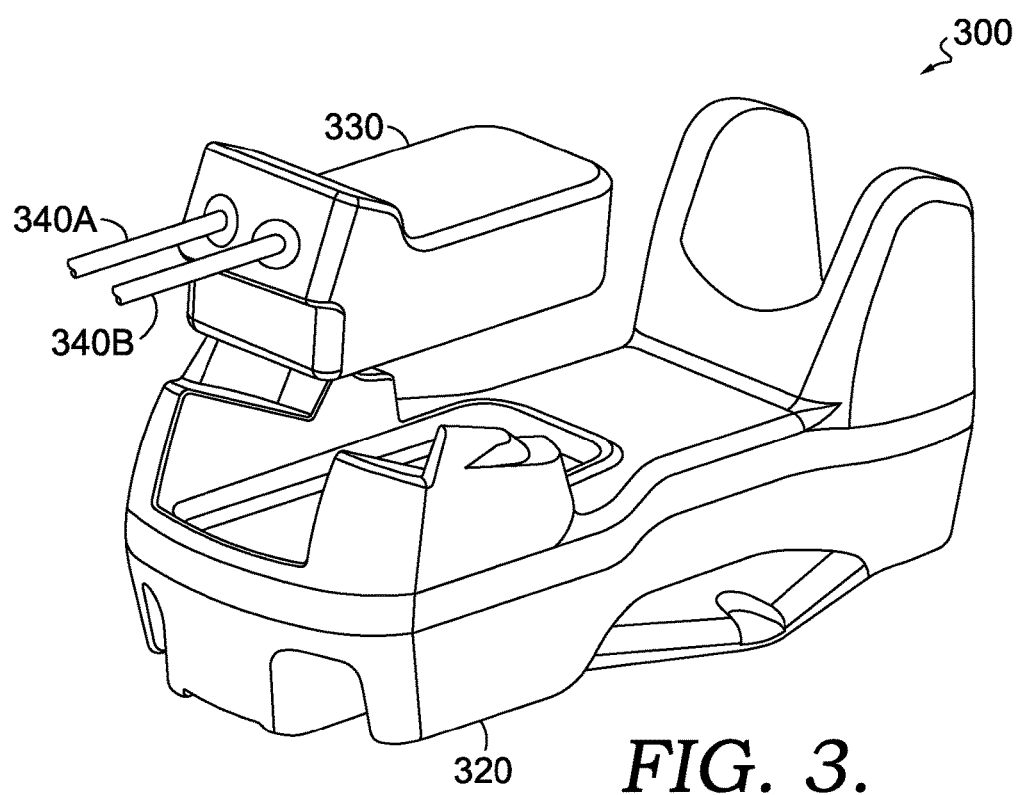
FIG. 3 is an illustration of a cradle with the adapter device removed, implemented in accordance with an embodiment of the present invention.

FIG. 3 is an illustration of the cradle 320 with the adapter device 330 removed, implemented in accordance with an embodiment of the present invention. The connection of the adapter device 330 to the cradle 320 is such that a shape of the adapter device 330 is integrated into the shape of the cradle 320 to form the integrated unit in a system 300. For example, the cradle 320 may have a cavity that is configured to receive the shape of the adapter device 330. In some embodiments, the adapter device 330, when inserted into such a cavity, may be flush with the surface of the cradle 320 (as shown in FIG. 2). In other embodiments, the adapter device 330 may at least partially protrude from the surface of the cradle 320, whereas in yet other embodiments at least partially rest below the surface of the cradle 320.

Cables 340A and 340B are connected to the adapter device 330 to provide power and data through the adapter device 330 to the cradle 320. When the adapter device 330 is detached and removed from the cradle 320, the cables 340A and 340B remain connected to the adapter device 330. The cradle 320 is reattached to the adapter device 330 or another cradle is attached to the adapter device 330. As shown, cables 340A and 340B are exemplary and another embodiment may implement one cable or several cables.

In some embodiments, the cables 340A and 340B that run from a host system (not shown) may connect to the adapter device 330 that is connected to the cradle 320. When the cradle 320 is removed, the adapter device 330 remains connected to the cables 340A and 340B and is easily accessible. An advantage of this solution reduces the need for an expert technician to remove the cables 340A and 340B from the cradle 320 before removal. Further, if the cables 340A and 340B are inaccessible, there is no need to gain access to change the cradle 320.

The adapter device 330 is shaped in a way that it is integrated into the shape of the cradle 320. As shown in the figures, the adapter device 330 and the cradle 320 fit integrally together. This design configuration allows the cradle 320 with the adapter device 330 to remain at a particular size without adding to the dimensions. The adapter device 330 matches with the dimension of the cradle 320. Additionally, the cradle 320 recharges the battery in the scanner when the cradle 320 holds the scanner.

In some embodiments, the adapter device 330 may be preassembled during an installation so that it is easily inserted into the cradle 320. In another embodiment, the adapter device 330 can be screwed onto the body of the cradle 330. In yet another embodiment, the adapter device 330 could also be mechanically coupled to the cradle 320 by various means to guarantee easy removal of the adapter device 330 even without tools. In one embodiment, mechanical features are used, such as mechanical guides or snaps, to correctly link the adapter device 330 and the cradle 320. In another embodiment, magnets may be incorporated into the cradle 320, the adapter device 330, or both the cradle 320 and the adapter device 330. The magnets have sufficient strength to secure the adapter device 330 and the cradle 320 during operation.

In an embodiment, the adapter device 330 is electrically connected to the cradle electronics with a dedicated connector between the adapter device 330 and the cradle 320. The adapter device 330 may be designed so that the integrated unit of the adapter device 330 and the cradle 320 is waterproof, which can provide water and dust protection of the integrated unit. In this configuration, a gasket may be placed around the connector or can be placed around the body of the adapter device 330. In either configuration, when the adapter device and cradle are coupled together in the integrated unit, the integrated unit is waterproof.

Figure 4:
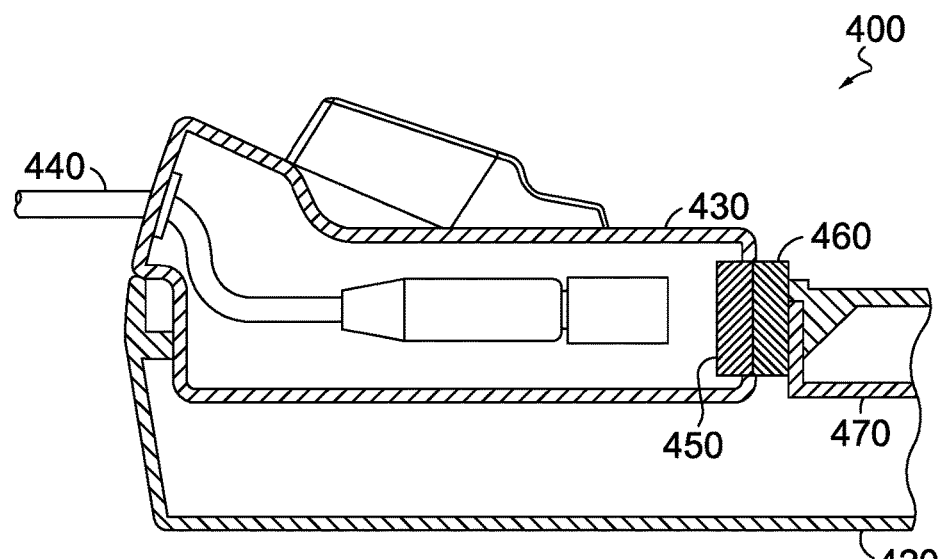
FIG. 4 is an illustration of a longitudinal sectional view of a cradle with an adapter device, implemented in accordance with an embodiment of the present invention.

In FIG. 4, a system 400 shows a partial longitudinal sectional view of a cradle 420 with an adapter device 430 connected thereto forming an integrated device. The sectional view shows a cable 440 that extends from an external area to within the adapter device 430. Although one cable 440 is shown in FIG. 4, it should be understood that additional cables may be present. The dedicated connection between the adapter device 430 and the cradle 420 occurs at a connector 450 and a connector 460. As shown, in an embodiment, the connector 450 may reside in the adapter device 430 while the connector 460 may reside in the cradle 420. The connector 460 may attach to a board 470, which also resides in the cradle 420. The idea here is to illustrate the connection from the external host system (not shown) through the cable 440 into the adapter device 430 to the connector 450 and connector 460 to the board 470 in the cradle 420.

Figure 5:
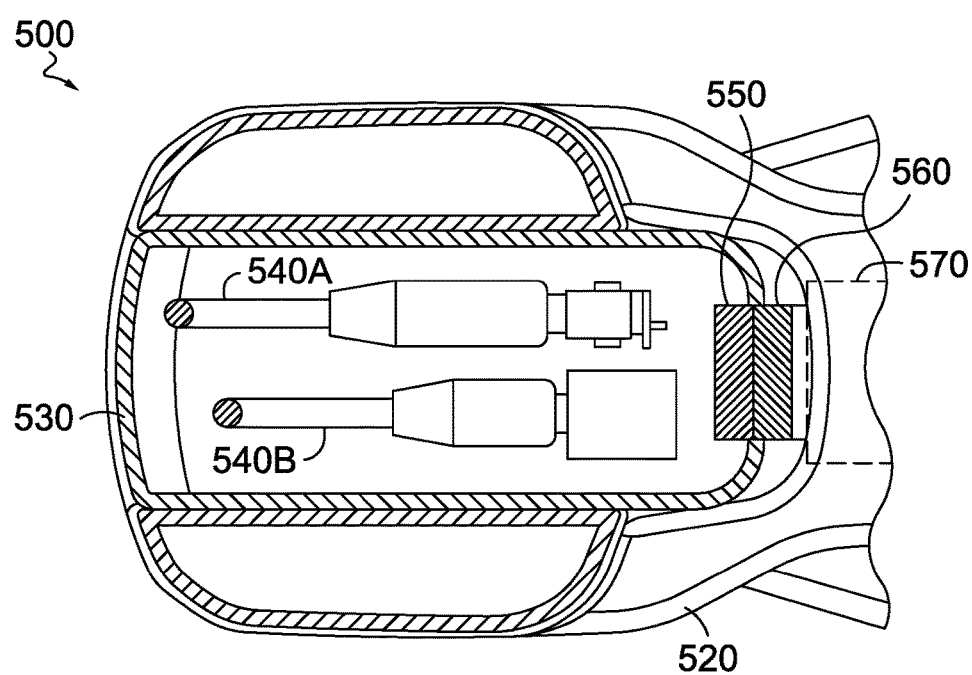
FIG. 5 is an illustration of a top view of a plane section of an adapter device docked in a cradle in FIG. 4, implemented in accordance with an embodiment of the present invention.

In FIG. 5, a system 500 shows a top view of a plane section of an adapter device 530 docked in a partial view of a cradle 520, similar to the cradle 420 in FIG. 4. The adapter device 530 has cables 540A and 540B, which typically connect to an external host system. The external host system could include a physical device for the transfer of data, a power system for providing power, or a combination of the physical device and the power system. FIG. 5 is a top planar view of FIG. 4 with the addition of multiple cables (540A and 540B) being shown. The dedicated connection between the adapter device 530 and the cradle 520 may occur at a connector 550 and a connector 560, which are respectively similar to the connectors 450 and 460. Likewise, the connector 560 connects to a board 570, which is similar to the board 470 in FIG. 4.

In some embodiments, it is possible to change the connectors, depending on the type of connection needed, by changing the connector inside the adapter device, the connector inside the cradle, or the board inside the cradle. In some embodiments, the connector 450 or 550 may reside on an adapter device board (not shown) that is removable and changeable to fit connection needs. The adapter device board may be developed with additional electronic components for additional functions, such as higher-level electromagnetic capability (EMC) protection, voltage adapter, interface conversion (e.g., serial to Ethernet), or any function related to the interface and power supply.

In addition to the ability to remove and replace cradles easily, embodiments of the invention provide several advantages over the existing art. As stated above, the adapter device may be configured such that the entire integrated unit is waterproof. Specifically, the adapter device may be formed with an Ingress Protection (IP) rating, such as IP65/IP67/IP68 ratings. An IP65 rating is considered dust tight. IP67 and IP68 ratings are considered waterproof. The mechanical connections between the adapter device and cradle can be made waterproof with the use of O-rings or gaskets. The integrated unit may use wireless charging solutions where external contacts for battery charging are not required. The transmission coil may be located in the cradle. The adapter device may have a separate battery pack. By integrating all of these features together, the integrated unit in this waterproof configuration may be used in environments with a high level of humidity or dust without affecting reliability.

In embodiments, the creation of a waterproof integrated unit of the adapter device and cradle allows for the development of a cradle that is also explosion proof (EX) rated. An EX rating typically means something is classified as safe for use in a hazardous area. Or, the EX rating means equipment that can prevent sparks within its housing from escaping to cause hazardous or life-threatening conditions. This type of embodiment is especially useful in dangerous environments, such as where petroleum exists.

Using the cradle as an interface to a host system and also as a charger for the scanner, the cradle has a data connection with a dedicated connector and a power connection with a dedicated connector, which may be implemented with different form factors and standards, depending on the type of installation and network infrastructure. In an embodiment, the cradle and the adapter device, identified together as the integrated unit, can connect with different types of wired interfaces, avoiding the development of different models of the cradle dedicated to a specific interface.

The cables that connect to the adapter device 330, 430, or 530 may be routed as shown in FIGS. 3-5 where the connection system is located in the back side of the cradle. In another embodiment, the cables may be routed below the cradle especially if the adapter device is integrated so that it can be reached from beneath the cradle (e.g. FIG. 11) or the adapter device is designed to be more centrally located in the cradle. This is another embodiment contemplated and disclosed herein, which may be especially useful if the space limitations prevent the implementation of the configuration as found in FIGS. 3-5. As shown in FIGS. 3-5, the adapter device 330, 430, or 530 is integrated into the cradle shape without increasing the overall dimensions beyond the cradle 320, 420, or 520.

Figure 6:
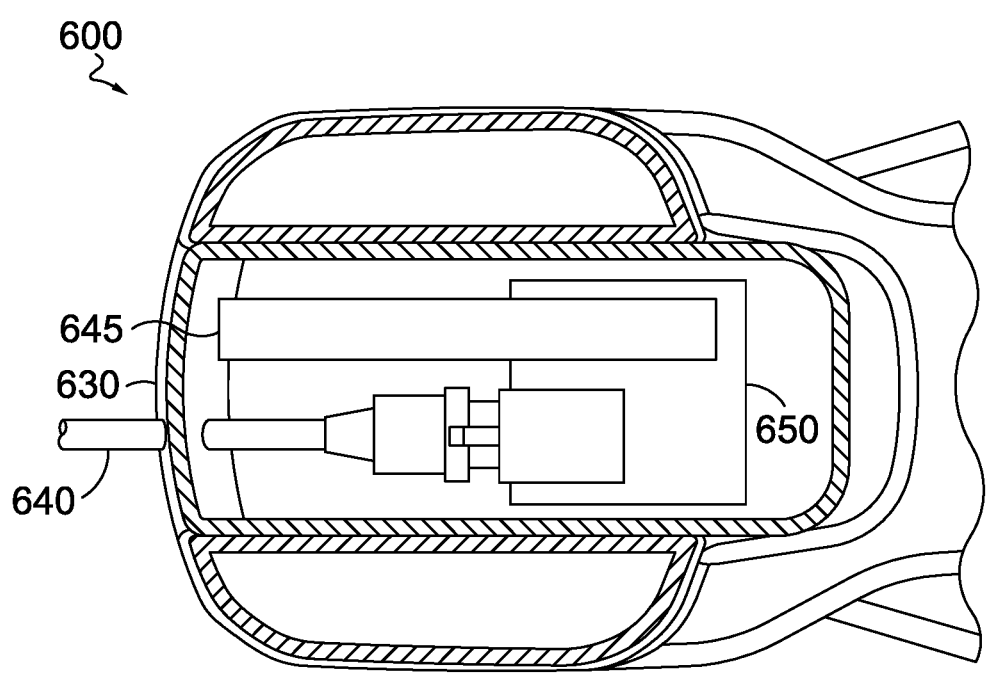
FIG. 6 is an illustration of a top view of a plane section of an auxiliary battery in an adapter device docked in a cradle in FIG. 4, implemented in accordance with an embodiment of the present invention.

In FIG. 6, an implementation of an embodiment of an adapter device 630 is shown docked in a partial view of the cradle 520 in FIG. 5. The adaptor device 630 includes an extra power unit, also called an auxiliary battery 645. Auxiliary battery 645 may be used in cases where the main power is not available or is not sufficient. Auxiliary battery 645 may be implemented as a battery pack or as a battery charger that recharges the scanner 210 when it is in the cradle, but the main power is not available. Additionally, the adapter device 630 can include control electronics 650 that provide the circuit to control the power unit activities. The use of the auxiliary battery 645 may occur when power is needed, such as when an interface cable 640 may provide a data connection, but not any power connection.

Continuing with FIG. 6, the auxiliary battery 645 can be designed to have a high capacity and may be charged through a USB port connection. Typically, when the connection is to a USB interface, a maximum available current to the adapter device 630 may be limited to five hundred milliamps (500 mA). The control electronics 650 may be implemented on a circuit board that connects to the auxiliary battery 645. Additionally, the control electronics 650 may use the available current that comes in through the USB port to provide power to the cradle 520 and to manage the recharging of the auxiliary battery 645. When the scanner 210 is not docked to the cradle 520, a majority of the current may be used to charge the auxiliary battery 645. When the scanner is docked to the cradle 520, the control electronics 650 may give priority to provide current to the scanner 210 and the cradle 520. The auxiliary battery 645 may get lower priority and may no longer be charged.

In an embodiment, the cradle can usually remain unaltered, implementing charging functions for the scanner, performing data transmission, and functioning with the mechanics designed to accept the insertion of the handheld scanner. In the lower part of the cradle, a pivotal standard connector can act as a single connection for power and data connection as shown in FIGS. 7-10. This standard connector can be implemented as a USB, RJ45, M5, M8, M12, M16, M23, or other connector, to name a few. In other embodiments, multiple connectors can be implemented in the cradle. As shown in FIGS. 7-10, the connector is implemented in a configuration such that it can be hidden from view when the cradle is used in its proper position.

Figure 7:
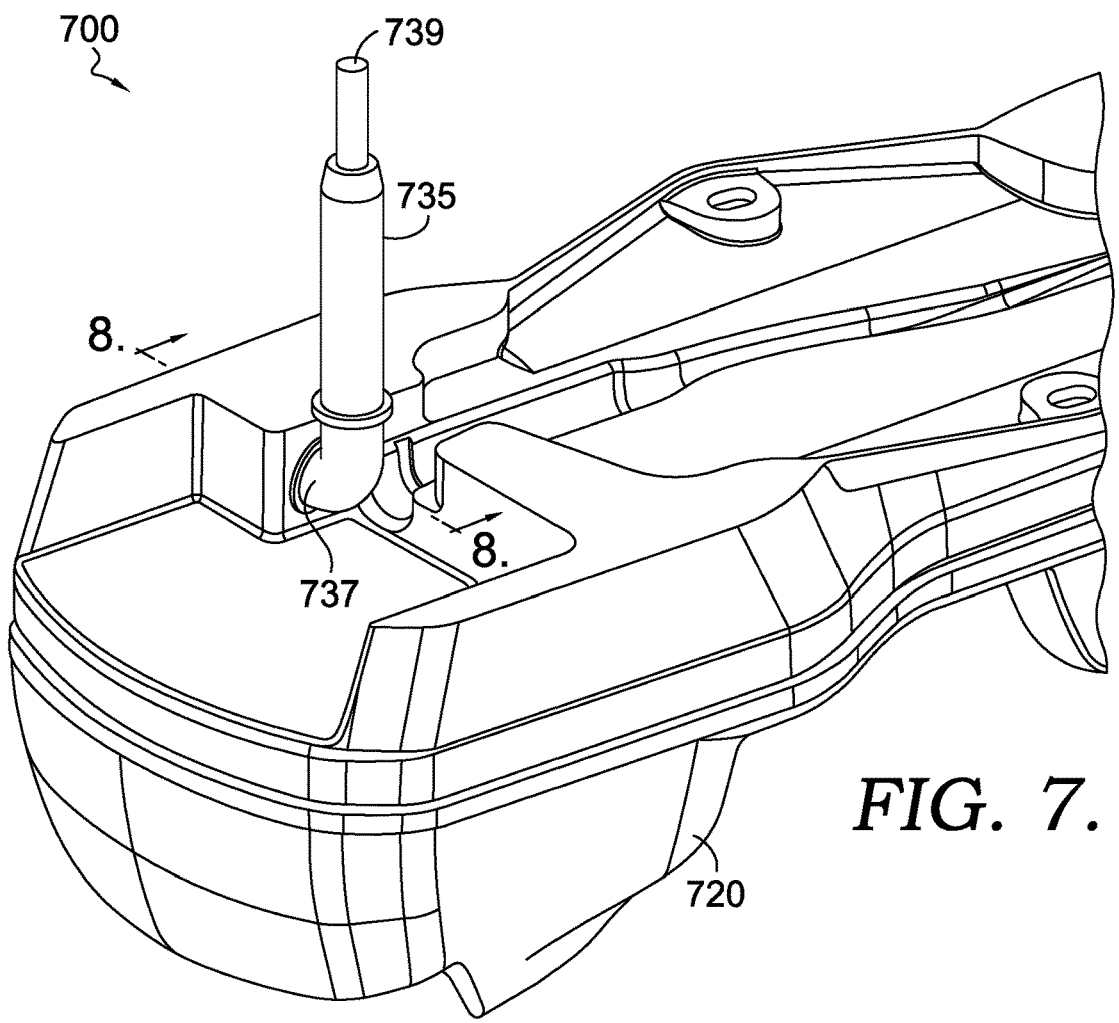
FIG. 7 is an illustration of a bottom view of a partial cradle with a pivotal connector, implemented in accordance with an embodiment of the present invention.
Figure 8:
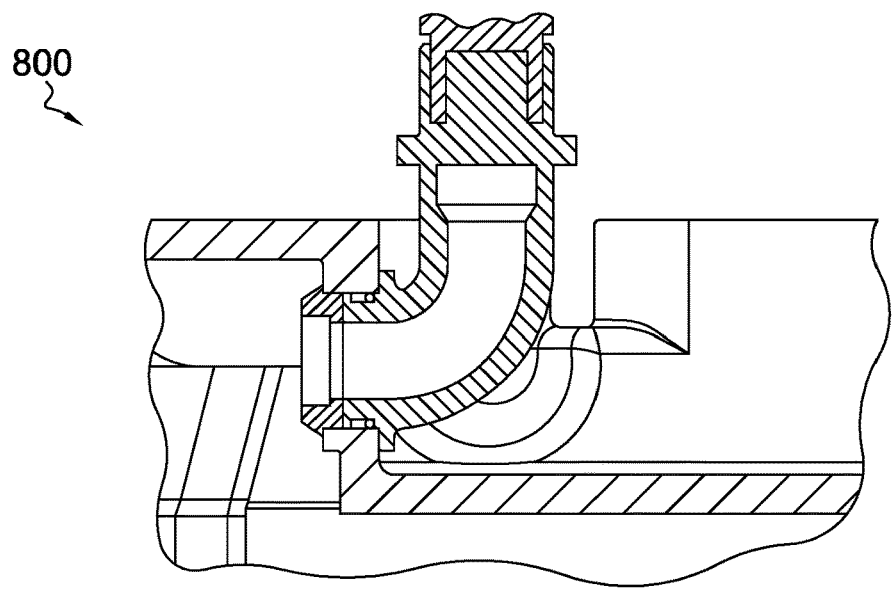
FIG. 8 is an illustration of a cross sectional view of the cradle with the pivotal connector in FIG. 7, implemented in accordance with an embodiment of the present invention.

In FIG. 7, a bottom view 700 of the cradle 720 with the pivotal connector 735 is shown. The cradle 720 is configured to hold a scanner where the cradle 720 has a cable connection to a host system. The cradle 720 has a pivotal connector 735 for power transmission and data transmission between the cradle 720 and the host system. The pivotal connector 735 is positioned so that at a first end 737 it rotates at an entry point into the cradle 720 and at a second end 739 it extends outward from the cradle 720 and moves radially when it rotates at the first end 737. At the second end 739, the pivotal connector 735 connects to a cable that connects to the host system. The cable is detachable from the pivotal connector 735. When detached, the cable can be reattached at the pivotal connector 735 to the cradle 720, or the cable can be attached to another pivotal connector connected to another cradle.

For clarity, the bottom of cradle 720 is shown to illustrate how the pivotal connector 735 can be implemented without adding space to cradle 720. The pivotal connector 735 is shown extended in an outward position. However, in various embodiments, the pivotal connector 735 can be rotated at the location 737 causing the endpoint 739 to move in a radial direction. For a detailed view, in FIG. 8, a cross sectional view 800 of the cradle 720 with the pivotal connector 735 in FIG. 7 is shown.

Figure 9:
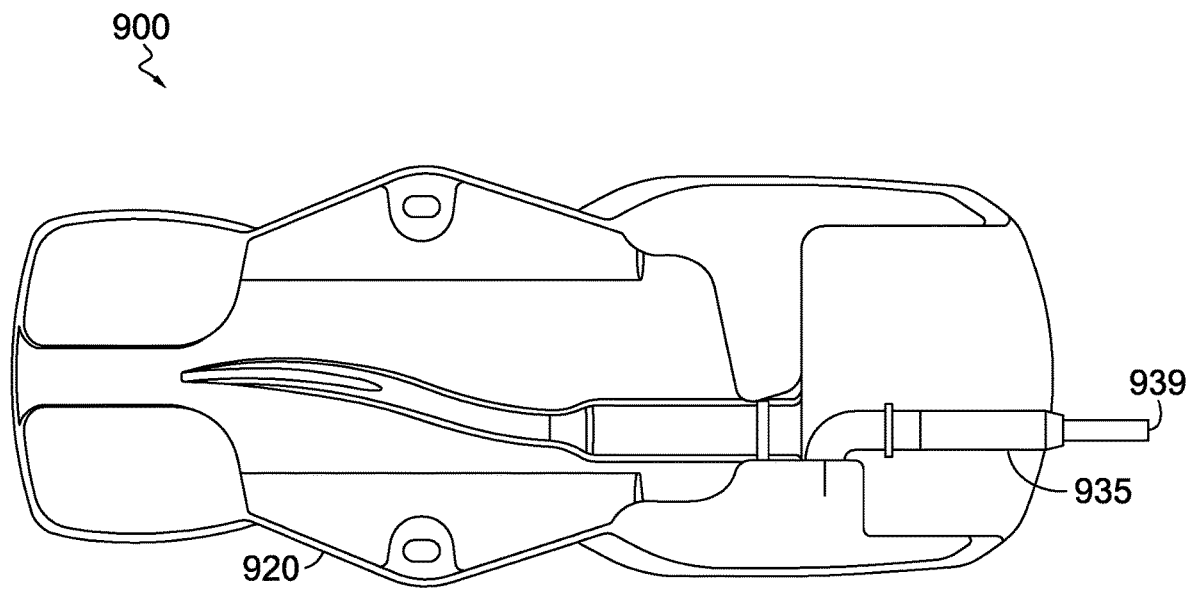
FIG. 9 is an illustration of a bottom view of a cradle with a pivotal connector in an extended or useable position, implemented in accordance with an embodiment of the present invention.
Figure 10:
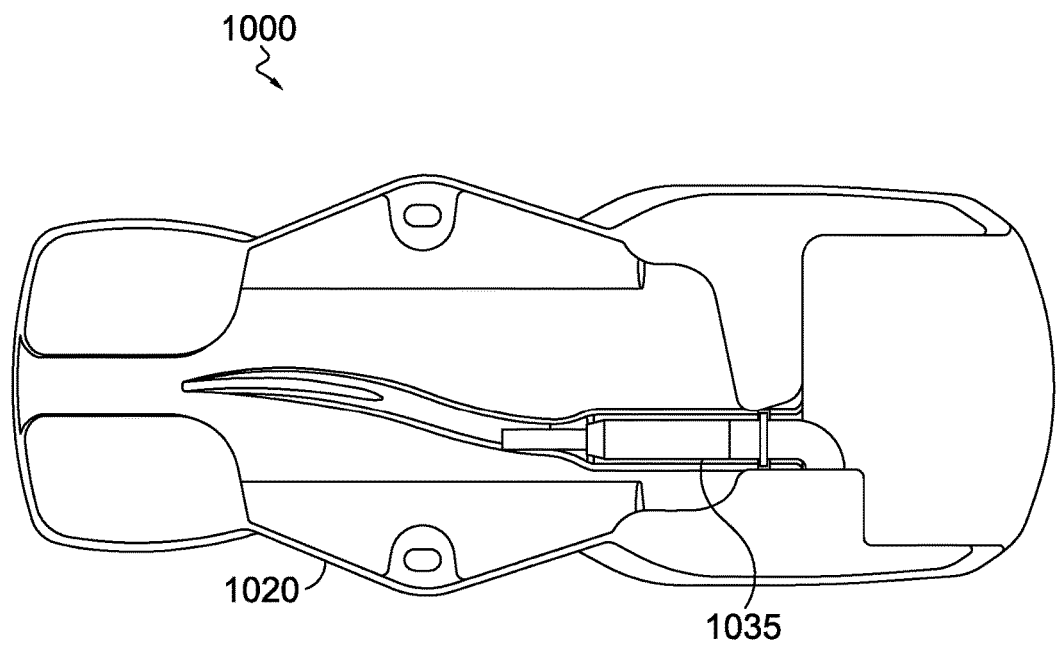
FIG. 10 is an illustration of a bottom view of a cradle with a pivotal connector in a closed position, implemented in accordance with an embodiment of the present invention.

In embodiments, bottom views 900 and 1000 are shown respectively in cradles 920 and 1020 in FIGS. 9 and 10. Cradles 920 and 1020 have respectively pivotal connectors 935 and 1035. The connectors provide the connection to the cradles 920 and 1020 for data and power transmissions. In FIG. 9, the pivotal connector 935 is rotated into a position where it can be connected to a cable or an adapter device. Endpoint 939 at the pivotal connector 935 can be a standardized connection for receipt of an interchangeable cable or interchangeable adapter device. Also, in other embodiments, the endpoint 939 and the pivotal connector 935 can be manufactured to a size that does not extend beyond the boundary of the cradles 920 and 1020.

In FIG. 10, the pivotal connector 1035 is rotated to a closed position when not in use, which is opposite to the position shown in FIG. 9. As shown, the pivotal connector 1035 fits neatly with the configuration of the cradle 1020. Also, when the cradles 920 and 1020 are placed in their upright positions, the location of the pivotal connectors 935 and 1035 are such that the cradles 920 and 1020 can be positioned with no obstructions from the pivotal connectors 935 and 1035.

Figure 11:
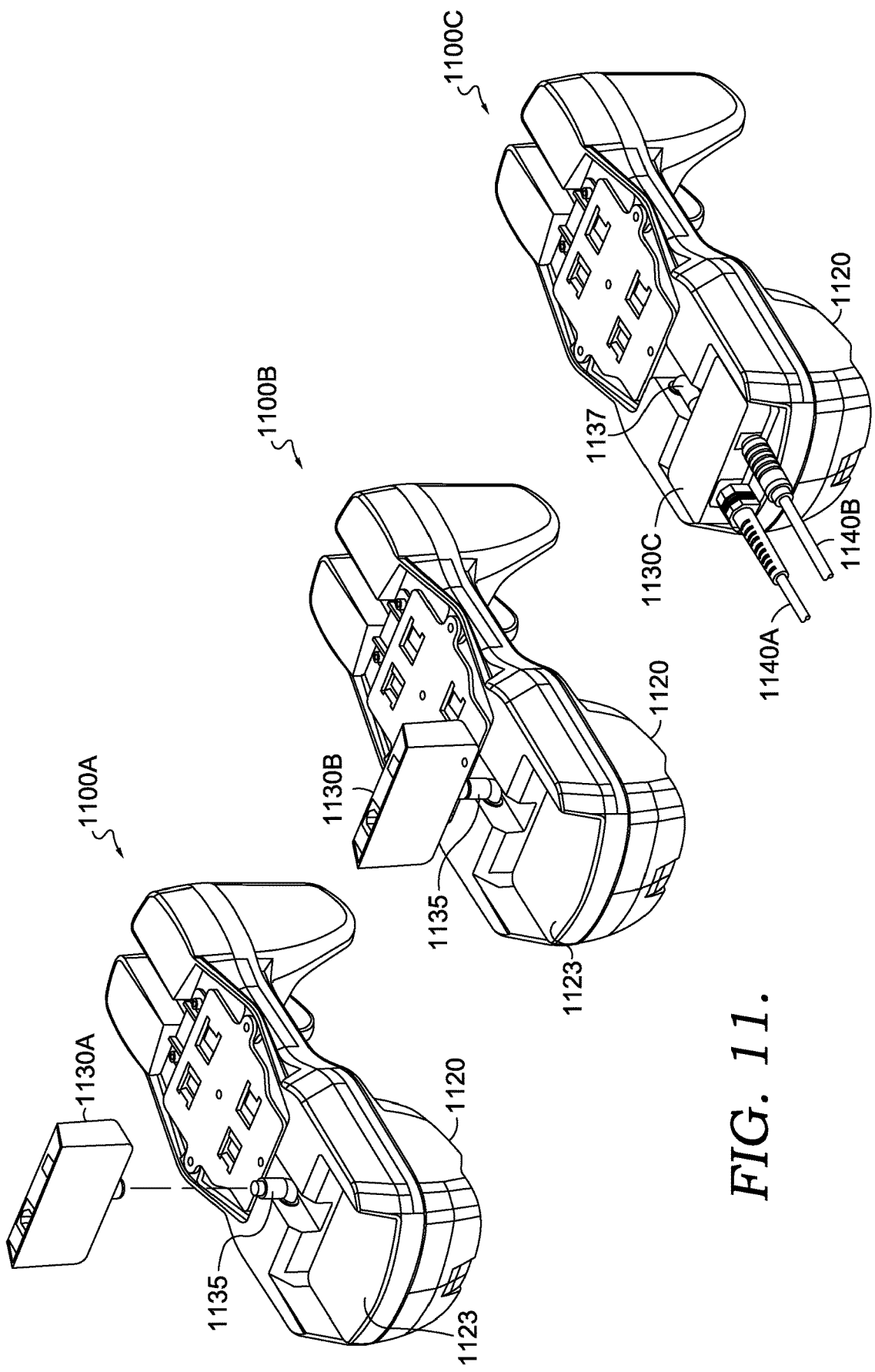
FIG. 11 is an illustration of bottom views of cradles showing the progress of connecting an adapter device to a pivotal connector, implemented in accordance with an embodiment of the present invention.

FIG. 11 shows the transition of attaching the adapter device to the cradle. As a result, a reference may be made to one graphic in FIG. 11, but not the others to illustrate the various positions of the adapter device in relation to the cradle. Views 1100A, 1100B, and 1100C show how the adapter devices 1130A, 1130B, and 1130C can be used with pivotal connectors 1135 and 1137. The adapter devices 1130A, 1130B, and 1130C connect respectively to a cradle 1120 to form an integrated unit for holding the scanner 210. The cradle 1120 has a pivotal connector 1135 in views 1100A and 1100B, and a pivotal connector 1137 in view 1100C, for power transmission and data transmission between the cradle 1120 and a host system. At a first interface, the adapter devices 1130A, 1130B, and 1130C show various stages of being attachable to and detachable from the cradle 1120 at the pivotal connector 1135 in a rotated outward position to the cradle 1120 and the pivotal connector 1137 at an inline planar position to the cradle 1120. At a second interface, the adapter device 1130C connects to cables 1140A and 1140B that connect to the host system. While the adapter device 1130C is connected to the cradle 1120 through the pivotal connector 1137, the adapter device 1130C is positioned with the cradle 1120 in a configuration where a shape of the adapter device 1130C is integrated into the shape of the cradle 1120 to form the integrated unit. The cradle 1120 is detachable and removable from the adapter device 1130A at the first interface with the pivotal connector 1135. The cradle 1120 is reattached or another cradle is attached to the adapter device at its pivotal connector.

In FIGS. 7-10, a discussion of pivotal connectors was disclosed including how the pivotal connectors could connect to a single cable. Here, the same pivotal connectors (1135 and 1137) can connect to adapter devices 1130A, 1130B, and 1130C as shown. Further, cradle 1120 has an area 1123 on the bottom, which can accommodate the adapter device 1130C in its resting or operating position. The area 1123 shows how the cradle 1120 can accommodate the adapter device 1130C without increasing the dimensions of the cradle 1120.

With specific reference to view 1100A of FIG. 11, the cradle 1120 is shown at the beginning of the connection process of the adapter device 1130A to the pivotal connector 1135. As shown, the pivotal connector 1135 is rotated to an outward position away from the cradle 1120 at the beginning to accommodate the connection. However, this position of the pivotal connector 1135 is not limiting and the pivotal connector 1135 may be rotated to another position that can connect to the adapter device 1130A.

In view 1100B of FIG. 11, the adapter device 1130B connects to the pivotal connector 1135. However, the adapter device 1130B is not in a resting or operating position. As discussed earlier, the pivotal connector 1135 may be a standardized connector or may be a connector that can accommodate different connection standards. An implementer of embodiments of the present invention has the flexibility in determining whether the pivotal connector 1135 will provide the standard connection or whether the adapter device 1130B will provide the standard connection. The idea here is to illustrate that the cradle 1120 can connect using a single connector or can connect to multiple cables using the adapter device 1130B.

In view 1100C of FIG. 11, the cradle 1120 is shown with the adapter device 1130C in an operating position to connect to cables 1140A and 1140B. In this configuration, the pivotal connector 1137 is a rotated version of the pivotal connector 1135. The adapter device 1130C rests in a position in the cradle 1120 identified by the area 1123.

In FIG. 11, in close proximity to the pivotal connectors 1135 and 1137, the external enclosure of the cradle 1120 shows the area 1123 on the bottom of the cradle 1120 to receive a connection of the adapter device (1130A, 1130B, or 1130C). In embodiments, a blocking mechanism (not shown) can be implemented for securing adapter devices 1130A, 1130B, and 1130C to the external enclosure of the cradle 1120. For example, the blocking mechanism could be a lever system, a snap-in mechanism, or a rail system.

As discussed above, the implementation of a standard pivotal connector allows for the use of a cradle either in combination with the adapter device as shown in FIG. 11, making multiple connection interfaces, or as a single connector for a single wire connection to a host system as shown in FIGS. 7-10. Additionally, the adapter device can be positioned in a lower part of the cradle as shown in FIG. 11 or located in another position as shown earlier in FIGS. 4-5. The location of the area 1123 in the cradle 1120 allows for an easier and more precise mating between the adapter device (1130A, 1130B, or 1130C) and the cradle 1120. There is also a reduced need for additional gaskets in the interface between the adapter device (1130A, 1130B, or 1130C) and the cradle 1120, since the pivotal connector (1135 or 1137) is implemented as a high IP grade connector.

The cost of the cradle and box in a waterproof configuration is cheaper than the individual components. Usually, waterproof connectors for the interface cables are very expensive. The sum of the individual costs of the cradle with waterproof connectors and the adapter device is higher than the invention as one integrated unit.

In another embodiment, the implementation of the adapter device integrated into the cradle can be done while also improving EMC protection. Typically, EMC protection is provided up to twenty (20) kilovolts. However, this invention provides EMC protection beyond that limitation to protect against harsh environments with electrostatic discharge and electromagnetic noise.

In conclusion, many different arrangements of the various components depicted, as well as components not shown, are possible without departing from the spirit and scope of embodiments of the present invention. Embodiments of the present invention have been described with the intent to be illustrative rather than restrictive. Certain features and sub-combinations are of utility and may be employed without reference to other features and sub-combinations and are contemplated to be within the scope of the claims.

What is claimed is:

1. An adapter device that connects to a cradle to form an integrated unit for holding a scanner, comprising:
    the adapter device is attachable to and removable from the cradle;
    a first interface forming a connection between the adapter device and the cradle, the connection of the adapter device to the cradle is such that a shape of the adapter device is integrated into the shape of the cradle to form the integrated unit independent of the scanner; and
    one or more cables are connected to the adapter device to provide power and data to the scanner through the cradle when the scanner is held by the cradle, the one or more cables connecting the adapter to a remote host system and/or a power supply at a second interface, wherein when the adapter device is detached and removed from the cradle, the one or more cables remain connected to the adapter device.

2. The adapter device of claim 1, wherein when the adapter device is connected to the cradle, the adapter device and the cradle form a waterproof seal such that the integrated unit is waterproof.

3. The adapter device of claim 1, wherein the connection between the adapter device and the cradle is achieved by one or more of screws, magnets, mechanical guides, or snaps at the first interface between the adapter device and the cradle.

4. The adapter device of claim 1, further comprising an auxiliary power source disposed within the adapter device that functions as a battery pack or a battery charger to recharge the scanner through the cradle when the scanner is held by the cradle.

5. The adapter device of claim 1, wherein the adapter device is configured to be reattached to a pivotal connector of the cradle at the first interface or to another pivotal connector of another cradle.

6. The adapter device of claim 5, wherein the pivotal connector has a standardized interface for connecting to the adapter device.

7. The adapter device of claim 6, wherein the standardized interface is for at least one of a USB, RJ45, M5, M8, M12, M16, or M23 connector.

8. The adapter device of claim 1, wherein the one or more cables are manufactured with the adapter device such that the one or more cables cannot be removed from the adapter device.

9. The adapter device of claim 1, further comprising control electronics within the adaptor device configured to control power unit activities for the cradle.

10. The adaptor device of claim 9, wherein the control electronics are configured to charge an auxiliary battery within the adaptor device when the scanner is not held by the cradle, and to prioritize powering the scanner when the scanner is held by the cradle.

11. The adapter device of claim 1, wherein the cradle has a cavity formed therein to receive the adapter device.

12. The adapter device of claim 11, wherein the adapter device fits within the cavity in a manner that a surface of the adapter device is flush with a surface of the cradle.

13. The adapter device of claim 1, wherein the adapter device is configured to provide power to a wireless power transmission coil located within the cradle to wirelessly charge the scanner when held by the cradle.

14. A cradle for holding a scanner, the cradle comprising:
    a receptacle shaped for holding the scanner; and
    a pivotal connector for power transmission from a power source to charge a battery in the scanner and to facilitate data transmission between the scanner and a host system through the cradle when the scanner is held by the cradle, the pivotal connector including:
    a first end configured to rotate radially at an entry point at the cradle; and
    a second end extending outward from the cradle and configured connect to a device that connects to the host system, wherein the device is detachable from the pivotal connector.

15. The cradle of claim 14, wherein the pivotal connector has a standardized interface for attachment to an interchangeable cable or an interchangeable adaptor device, wherein the pivotal connector has the standardized interface for at least one of a USB, RJ45, M5, M8, M12, M16, or M23 connector.

16. The cradle of claim 15, further comprising changing the pivotal connector with one type of standardized interface to another pivotal connector with another type of standardized interface.

17. The cradle of claim 14, further comprising the pivotal connector is disconnected from the cable and an adapter device, at a first interface, is connected to the pivotal connector, which is connected to the cradle, the adapter device is positioned with the cradle in a configuration where a shape of the adapter device is integrated into the shape of the cradle, wherein the adapter device, at a second interface, connects to the cable or one or more cables to the host system.

18. The cradle of claim 14, wherein the device connected between the pivotal connector and the remote host is a single interchangeable cable.

19. The cradle of claim 14, wherein the device connected between the pivotal connector and the remote host is an interchangeable adaptor device having an interface at which one or more cables are connected to the remote host and/or the power source.

20. The cradle of claim 19, wherein the interchangeable adaptor device, when connected to the rotatable pivotal connector, fits into an area of the cradle without increasing the overall dimensions of the cradle.

* * * * *